United States Patent
Umeda

(10) Patent No.: US 10,210,237 B2
(45) Date of Patent: Feb. 19, 2019

(54) INFORMATION PROCESSING SYSTEM, SIMILAR CATEGORY IDENTIFICATION METHOD, PROGRAM, AND COMPUTER READABLE INFORMATION STORAGE MEDIUM

(71) Applicant: Rakuten, Inc., Tokyo (JP)

(72) Inventor: Takashi Umeda, Tokyo (JP)

(73) Assignee: Rakuten, Inc., Tokyo (JP)

( * ) Notice: Subject to any disclaimer, the term of this patent is extended or adjusted under 35 U.S.C. 154(b) by 738 days.

(21) Appl. No.: 14/387,547

(22) PCT Filed: Apr. 23, 2013

(86) PCT No.: PCT/JP2013/061882
§ 371 (c)(1),
(2) Date: Sep. 24, 2014

(87) PCT Pub. No.: WO2014/002595
PCT Pub. Date: Jan. 3, 2014

(65) Prior Publication Data
US 2015/0088862 A1    Mar. 26, 2015

(30) Foreign Application Priority Data
Jun. 29, 2012 (JP) .................... 2012-147981

(51) Int. Cl.
*G06F 17/30* (2006.01)
*G06Q 30/00* (2012.01)
*G06Q 30/06* (2012.01)

(52) U.S. Cl.
CPC .. *G06F 17/30598* (2013.01); *G06F 17/30867* (2013.01); *G06Q 30/00* (2013.01); *G06Q 30/0629* (2013.01)

(58) Field of Classification Search
CPC ......... G06F 17/30864; G06F 17/30867; G06F 17/30011; G06F 17/30675; G06F 17/30696; G06F 17/30598; G06F 17/30985; G06F 17/30997; G06F 17/3071; G06F 17/30554; G06F 17/30613; G06F 17/30734;
(Continued)

(56) References Cited

U.S. PATENT DOCUMENTS 8,055,548 B2 * 11/2011 Staib .................... G06Q 10/107
                                                            705/26.1
8,768,910 B1 *  7/2014 Bunn ................ G06F 17/30663
                                                            707/706
(Continued)

FOREIGN PATENT DOCUMENTS

JP         H11-328217 A      11/1999

*Primary Examiner* — Jeff A Burke
*Assistant Examiner* — Rezwanul Mahmood
(74) *Attorney, Agent, or Firm* — HEA Law PLLC

(57) ABSTRACT

To reduce time and labor in identifying a similar category among a plurality of categories into which objects are classified. Based on a predetermined operation performed by a user with respect to two objects among a plurality of objects classified into some of a plurality of predetermined categories, the information processing system deduces the two objects as comparison targets. Then, based on the number of times at which the two objects are deduced as comparison targets, the information processing system determines two categories into which the two objects are respectively classified as similar categories.

14 Claims, 18 Drawing Sheets

(58) Field of Classification Search
CPC ........... G06F 17/3043; G06F 17/30038; G06F 17/3005; G06F 17/30058; G06F 17/30256
See application file for complete search history.

(56) References Cited

U.S. PATENT DOCUMENTS

| | | | | |
|---|---|---|---|---|
| 8,799,314 B2* | 8/2014 | Kang | ................ | G06F 17/30997 707/771 |
| 9,418,102 B2* | 8/2016 | Inoue | ................ | G06F 17/30389 |
| 2002/0186241 A1* | 12/2002 | Kohda | ............. | G06F 17/30011 715/744 |
| 2004/0073918 A1* | 4/2004 | Ferman | ................ | H04H 60/46 725/34 |
| 2005/0144162 A1* | 6/2005 | Liang | ................ | G06F 17/30109 707/999.003 |
| 2008/0010269 A1* | 1/2008 | Parikh | ............... | G06F 17/30616 707/999.005 |
| 2009/0024605 A1* | 1/2009 | Yang | ................ | G06F 17/30867 707/999.005 |
| 2010/0082410 A1* | 4/2010 | Baudin | ............. | G06Q 30/0201 707/E17.014 |
| 2010/0325135 A1* | 12/2010 | Chen | ................ | G06F 17/30053 707/759 |
| 2011/0035400 A1* | 2/2011 | Nishida | ................ | G06Q 30/02 707/769 |
| 2011/0125791 A1* | 5/2011 | Konig | ................ | G06F 17/30864 707/770 |
| 2011/0208729 A1* | 8/2011 | Hamano | ................ | G06Q 30/02 707/723 |
| 2012/0130816 A1* | 5/2012 | Sakamoto | ......... | G06F 17/30663 705/14.55 |
| 2012/0330937 A1* | 12/2012 | Frazier | ............. | G06F 17/30873 707/723 |
| 2013/0066705 A1* | 3/2013 | Umeda | ............. | G06Q 30/0241 705/14.41 |
| 2013/0066707 A1* | 3/2013 | Umeda | ............. | G06Q 30/0272 705/14.42 |
| 2013/0066714 A1* | 3/2013 | Umeda | ................ | G06Q 30/02 705/14.46 |
| 2013/0066715 A1* | 3/2013 | Umeda | ................ | G06Q 30/02 705/14.46 |
| 2013/0066725 A1* | 3/2013 | Umeda | ............. | G06Q 30/0275 705/14.66 |
| 2013/0066726 A1* | 3/2013 | Umeda | ............. | G06Q 30/0275 705/14.71 |
| 2013/0080264 A1* | 3/2013 | Umeda | ................ | G06Q 30/02 705/14.69 |
| 2013/0173619 A1* | 7/2013 | Inoue | ................ | G06F 17/30389 707/736 |
| 2014/0188847 A1* | 7/2014 | Tang | ................ | G06F 17/30551 707/722 |
| 2014/0229229 A1* | 8/2014 | Hirate | ................ | G06Q 10/00 705/7.29 |
| 2015/0088862 A1* | 3/2015 | Umeda | ................ | G06Q 30/00 707/722 |
| 2015/0169708 A1* | 6/2015 | Song | ................ | G06F 17/30247 707/722 |
| 2018/0089712 A1* | 3/2018 | Watanabe | ......... | G06Q 30/0201 |
| 2018/0232438 A1* | 8/2018 | Gu | ........................ | G06F 17/30 |

\* cited by examiner

FIG.6

| USER ID | SEARCH KEYWORD | TIMESTAMP OF SEARCH |
|---|---|---|
| user1 | DRINK A | 13:00 4/1/2012 |
| user1 | DRINK B | 13:05 4/1/2012 |
| user1 | TV PROGRAM C | 13:10 4/1/2012 |

FIG.7

SEARCH RESULT FOR "DRINK A"

DRINK A CLASSIC, ONE
☐ COMPARE   SHOP : AAA

DRINK A CLASSIC, PACK OF 5
☐ COMPARE   SHOP : AAA

DRINK A, BARGAIN
☐ COMPARE   SHOP : BBB

DRINK A, New
☐ COMPARE   SHOP : BBB

FIG.8
| PRODUCT COMPARISON | | |
|---|---|---|
| PRODUCT NAME | DRINK A CLASSIC, ONE | DRINK A, BARGAIN |
| IMAGE |  |  |
| PRICE | ¥500 | ¥1,500 |
| DESCRIPTION | --------- --------- --------- | |
| SHOP NAME | AAA | BBB |

FIG.9

| USER ID | REFERRER | TIMESTAMP OF COMPARISON | PRODUCT ID1 | PRODUCT ID2 | ... |
|---------|----------|-------------------------|-------------|-------------|-----|
| user1 | http://mall.com/search/drinkA | 13:03 4/1/2012 | drA11 | otdr1 | ... |

FIG.10

| USER ID | TIMESTAMP OF VIEW | PRODUCT ID | SEARCH CONDITION FOR DISPLAYING LIST |
|---------|-------------------|------------|--------------------------------------|
| user1 | 13:01 4/1/2012 | drA11 | DRINK A |
| user1 | 13:01 4/1/2012 | otdr1 | DRINK A |

FIG.11

SHOP: AAA

「DRINK A CLASSIC, ONE」

PRICE    ¥500

QUANTITY

REGISTER IN MY FAVORITE     ADD TO CART

FIG.13

| PRODUCT ID1 | PRODUCT ID2 | USER ATTRIBUTE |
|---|---|---|
| drA11 | otdr1 | MALE |
| otdr1 | kurn1 | MALE |

FIG.16

| CATEGORY 1 | NUMBER OF TIMES OF COMPARISON INVOLVING PRODUCT IN CATEGORY 1 | CATEGORY 2 | NUMBER OF TIMES OF COMPARISON INVOLVING PRODUCT IN CATEGORY 2 | NUMBER OF TIMES OF COMPARISON BETWEEN PRODUCT IN CATEGORY 1 AND PRODUCT IN CATEGORY 2 |
|---|---|---|---|---|
| PHARMACEUTICAL DRUG, QUASI-DRUG / QUASI-DRUG / NUTRIENTS, PHYSICAL EXHAUSTION | 34 | HEALTH FOOD / NUTRITION, HEALTHY DRINK / NUTRITIONAL DRINK | 85 | 12 |
| HANDICRAFT, CRAFT, CLOTH / SEWING MATERIAL | 15 | HANDICRAFT, CRAFT, CLOTH / BEADS | 13 | 3 |
| HANDICRAFT, CRAFT, CLOTH / BEADS | 13 | ACCESSORY / ACCESSORY KIT | 12 | 2 |
| HANDICRAFT, CRAFT, CLOTH, | 30 | ACCESSORY | 30 | 8 |

FIG.19
RECOMMENDATION FROM AMONG PRODUCTS
CHECKED RECENTLY
 INSTANT SANUKI UDON NOODLE, CHEAP
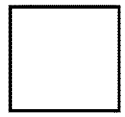 ORIGINAL SANUKI UDON NOODLE
RECENTLY CHECKED PRODUCTS
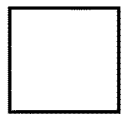 INSTANT SANUKI UDON NOODLE, FREE SHIPPING

FIG.20

SEARCH RESULT FOR "STONE"

POWER STONE BRACELET
☑ COMPARE    SHOP:ABC

STONE PATTERNED FLOOR MATERIAL
☐ COMPARE    SHOP:DIY

POWER STONE IN SMALL BOTTLE
☐ COMPARE    SHOP:ABC

NATURAL STONE BRACELET
☐ COMPARE    SHOP:BBB

INFORMATION PROCESSING SYSTEM, SIMILAR CATEGORY IDENTIFICATION METHOD, PROGRAM, AND COMPUTER READABLE INFORMATION STORAGE MEDIUM

CROSS REFERENCE TO RELATED APPLICATIONS

This application is a National Stage of International Application No. PCT/JP2013/061882 filed on Apr. 23, 2013 claiming priority based on Japanese Patent Application No. 2012-147981 filed on Jun. 29, 2012. The contents of each of the above documents are incorporated herein by reference in their entirety.

TECHNICAL FIELD

The present invention relates to an information processing system, a similar category identification method, a program, and a computer readable information storage medium.

BACKGROUND ART

In a system, such as a so-called electronic commerce or the like, that presents a product to a user via a network or the like, products for sales are classified into categories and registered in a database. As a use of categories, as shown in the basic classification table in Patent Literature 1, categories for classified products are strictly defined in advance so that products are automatically classified into categories. However, in actuality, it is generally arranged such that categories can be registered with flexibility, depending on a situation of sales of products, so that products can be classified into categories at shop's discretion. In a system that provides information, such as cooking information, accommodation facility information, or the like, as well, it is generally a case that objects of information to be provided are classified into categories by an information provider.

CITATION LIST

Patent Literature

Patent Literature 1: Japanese Patent Laid-open Publication No. H11-328217

SUMMARY OF INVENTION

Technical Problem

For example, when the number of categories which are classified objects increases along with an increase of the number of products dealt in an electronic commerce site, a case that an attribute of a product classified in one of two categories is very similar to that of a product classified in the other category may be occurred. In the following, such two categories will be referred to as mutually similar categories. In this case, it is desirable in view of product search and aggregation of purchase history or the like, for example, to know mutually similar categories in advance. However, there is a problem that it takes too much time and labor to manually check the category names and objects classified in the respective categories.

The present invention has been conceived in view of the above, and aims to provide a technique for reducing time and labor in identifying mutually similar categories among a plurality of categories which are classified objects.

Solution to Problem

In order to achieve the above described objects, an information processing system according to the present invention includes comparison target deducing means for deducing, based on a predetermined operation performed by a user with respect to two objects among a plurality of objects respectively classified into some of a plurality of predetermined categories, the two objects as comparison targets; and similar category determination means for determining two categories into which the two objects are respectively classified as similar categories, based on a number of times at which the comparison target deducing means deduces the two objects as the comparison targets.

A similar category identification method according to the present invention includes a step of deducing, based on a predetermined operation performed by a user with respect to two objects among a plurality of objects respectively classified into some of a plurality of predetermined categories, the two objects as comparison targets; and a step of determining two categories into which the two objects are respectively classified as similar categories, based on a number of times at which the two objects are deduced as the comparison targets.

A program according to the present invention causes a computer to deduce, based on a predetermined operation performed by a user with respect to two objects among a plurality of objects respectively classified into some of a plurality of predetermined categories, the two objects as comparison targets; and to determine two categories into which the two objects are respectively classified as similar categories, based on a number of times at which the two objects are deduced as the comparison targets.

A computer readable information storage medium according to the present invention stores the above described program.

According to the present invention, it is possible to reduce time and labor in identifying mutually similar categories from among a plurality of categories into which objects are classified.

According to one aspect of the present invention, the comparison target deducing means may deduce two of a plurality of objects which the user instructs to display on one screen for comparison, as the comparison targets.

According to one aspect of the present invention, the comparison target deducing means may not deduce a comparison target from among a plurality of objects which the user instructs to display on one screen for comparison not via a screen showing a plurality of objects that are searched for by object search means, based on a keyword inputted by the user.

According to one aspect of the present invention, the comparison target deducing means may deduce two objects among a plurality of objects with respect to which the user instructs object detail display means to display in detail among a plurality of objects that are searched for by object search means, based on a keyword inputted by the user.

According to one aspect of the present invention, when a number of kinds of categories into which a plurality of objects to be displayed in a list are classified is greater than a predetermined threshold, the comparison target deducing means may not deduce a comparison target from among the plurality of objects to be displayed in a list.

According to one aspect of the present invention, an information processing system may include means for obtaining, when ratios of the respective numbers of objects in respective categories retrieved by the object search means, based on one keyword inputted by the user, are similar to ratios of the respective numbers of objects in respective categories retrieved by the object search means based on another keyword inputted by the user, these two keywords, and the comparison target deducing means may deduce as the comparison targets two objects among a plurality of objects with respect to which the user instructs object detail displaying means to display in detail among a plurality of objects that are retrieved, based on the two keywords.

According to one aspect of the present invention, the comparison target deducing means may obtain, as the comparison targets, two objects among a plurality of objects which the user registers in a list of objects to view later among a plurality of objects to be displayed in a list.

According to one aspect of the present invention, the plurality of categories may a hierarchy tree structure, and when two categories into which two objects included in a combination of the objects are respectively classified have a parent-child relationship, the similar category determination means may not determine the two categories as mutually similar categories.

According to one aspect of the present invention, when the predetermined operation is made according to an automatic travelling program, the comparison target deducing means may not deduce a comparison target based on this operation.

According to one aspect of the present invention, the comparison target deducing means may deduce the comparison target which are correlated to an attribute of the user, and the similar category determination means may determine two mutually similar categories for every attribute, based on the categories into which the two deduced objects are classified and attributes correlated to the respective categories.

According to one aspect of the present invention, the plurality of categories may have a hierarchy tree structure, and when parent categories of two categories that are determined similar to the same category are similar to each other, the similar category determination means may determine the two categories as mutually similar categories.

According to one aspect of the present invention, based on the category names of two respective categories which are determined similar to the same category, the similar category determination means may determine whether or not the two categories are mutually similar categories.

According to one aspect of the present invention, based on a search keyword used in searches for objects included in two respective categories that are determined similar to a same category, the similar category determination means may determine whether or not the two categories are mutually similar categories.

According to one aspect of the present invention, information processing system may include history obtaining means for obtaining a history record relevant to an object, and history aggregation means for aggregating the history records relevant to the object, using a category into which the object is classified, and the history aggregation means may aggregate the history records, using a group including the two categories similar to each other.

According to one aspect of the present invention, the information processing system may further include list output means for outputting data on a screen showing the objects in a list for a user to select an object to be the comparison target, and comparison display means for outputting data on a screen showing details of the object selected on the screen by the user to be the comparison target, and when the user selects an object to be the comparison target, the list output means may output data on the screen on which the object to be the comparison target is selected, such that a display manner of an object classified into a category similar to a category into which the object selected is classified is changed.

According to one aspect of the present invention, the information processing system may further include means for retrieving an object, using a search condition including a category designated by the user, and means for displaying a list of objects searched for by the object search means, and when a number of objects retrieved for based on the search condition designated by the user is less than a predetermined threshold, the means for retrieving an object may retrieve an object, using a search condition including a category similar to the category designated by the user.

According to one aspect of the present invention, the information processing system may further include recommendation means for obtaining an object to recommend to the user and for recommending to the user, when the number of objects obtained is less than a predetermined threshold, any of the objects classified into a category similar to the category of the object obtained, in addition to the object obtained.

BRIEF DESCRIPTION OF DRAWINGS

FIG. 6 shows one example of a search history;

FIG. 7 shows one example of a product list screen;

FIG. 8 shows one example of a product comparison screen;

FIG. 9 shows one example of a comparison history;

FIG. 10 shows one example of a product viewing history;

FIG. 11 shows one example of a product detail screen;

FIG. 13 shows one example of a combination of products outputted by the comparison product obtaining unit;

FIG. 16 shows one example of aggregate data indicating aggregate frequency of appearance of a category combination;

FIG. 19 shows one example of a recommendation screen;

FIG. 20 shows another example of the product list screen; and

DESCRIPTION OF EMBODIMENTS

Figure 1:
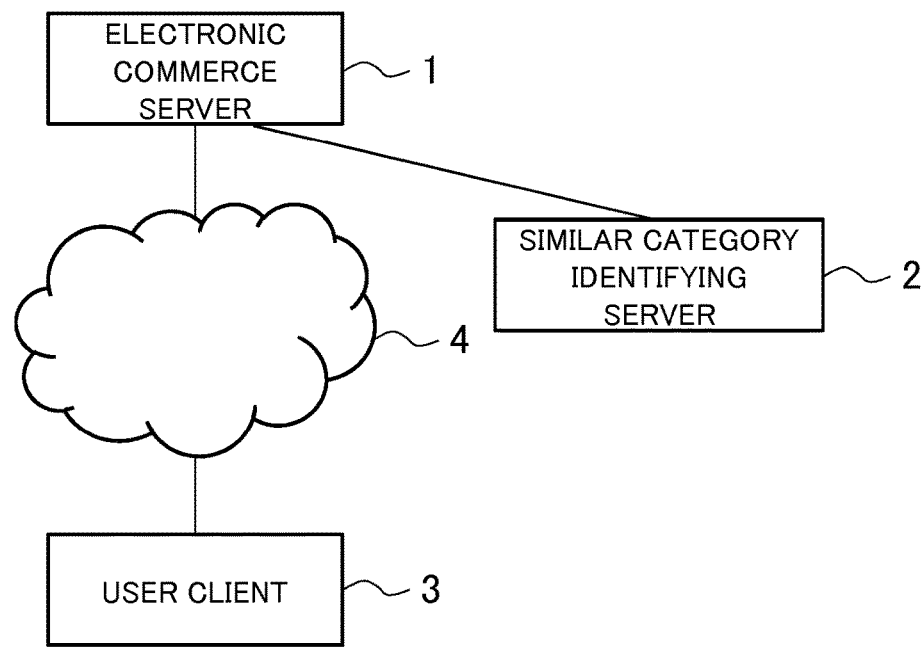
FIG. 1 shows one example of a structure of an electronic commerce system according to an embodiment of the present invention.

In the following, an embodiment of the present invention will be described, based on the drawings. As to structures identified by the same reference numeral, duplicated descriptions are not repeated unless there is any difference between the structures. In the following, the present invention is described, using an electronic commerce system, with respect to a case in which products are classified into categories.

FIG. 1 shows one example of a structure of an electronic commerce system according to an embodiment of the present invention. The electronic commerce system includes an electronic commerce server 1, a similar category identifying server 2, and a user client 3. These are connected to one another via the Internet 4, which is one type of a network. Although the system uses a web in this embodiment web, the system may use a so-called client-server model.

The electronic commerce server 1 is a server for implementing a function of a shop conducting electronic commerce. Specifically, the electronic commerce server 1 implements an electronic shopping mall, and provides functions of product search, product presentation, settlement and logistics support, and the like. The similar category identifying server 2 is a server for identifying mutually similar categories, using a variety of history information items outputted by the electronic commerce server 1. The user client 3 is a computer to be operated by a user, being, for example, a personal computer, a mobile terminal, or the like.

Figure 2:
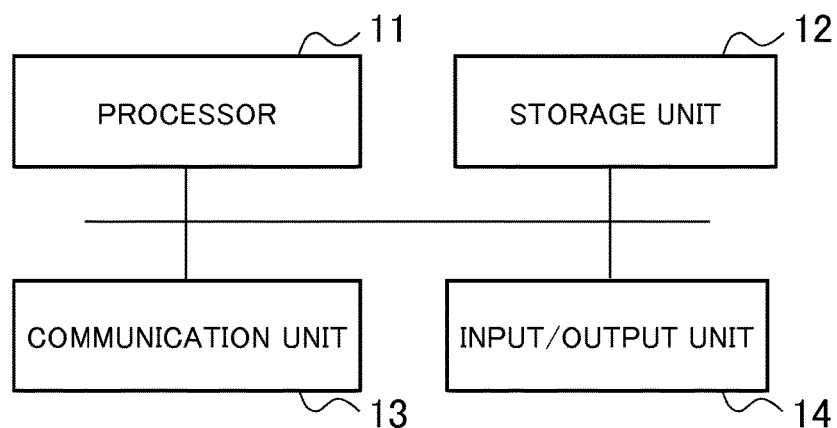
FIG. 2 shows one example of a hardware structure of the electronic commerce server and a similar category identifying server.

FIG. 2 shows one example of a hardware structure of the electronic commerce server 1 and the similar category identifying server 2. Each of the electronic commerce server 1 and the similar category identifying server 2 includes a processor 11, a storage unit 12, a communication unit 13, and an input/output unit 14. Each of the electronic commerce server 1 and the similar category identifying server 2 may be a server computer installed in a data center or the like.

The processor 11 operates according to a program stored in the storage unit 12. The processor 11 controls the communication unit 13 and the input/output unit 14. The above mentioned program may be provided via a network, such as the Internet 4 or the like, or provided as being stored in a computer readable storage medium, such as a DVD-ROM or the like.

The storage unit 12 is made using a memory device, such as a RAM, a flash memory, or the like, or a hard disk drive or the like. The storage unit 12 stores the above mentioned program. The storage unit 12 further stores information and an operation result inputted from the respective units.

The communication unit 13 implements a function for communication with other devices, such as the user client 3 or the like, and is configured of, for example, a network card having an integrated circuit and a communication terminal and constituting a wired LAN. Under control by the CPU 11, the communication unit 13 inputs information received from other devices to the CPU 11 or the storage unit 12, and sends information to other devices.

The input/output unit 14 is a circuit for communication with a display output device and an input device, and is configured of, for example, a graphics board for outputting an image to a display output device and a USB controller for obtaining data from an input device, such as a keyboard, a mouse, or the like. Under control by the processor 11, the input/output unit 14 outputs image data or the like to a display output device, and obtains information from an operator (a user) from an input device.

Figure 3:
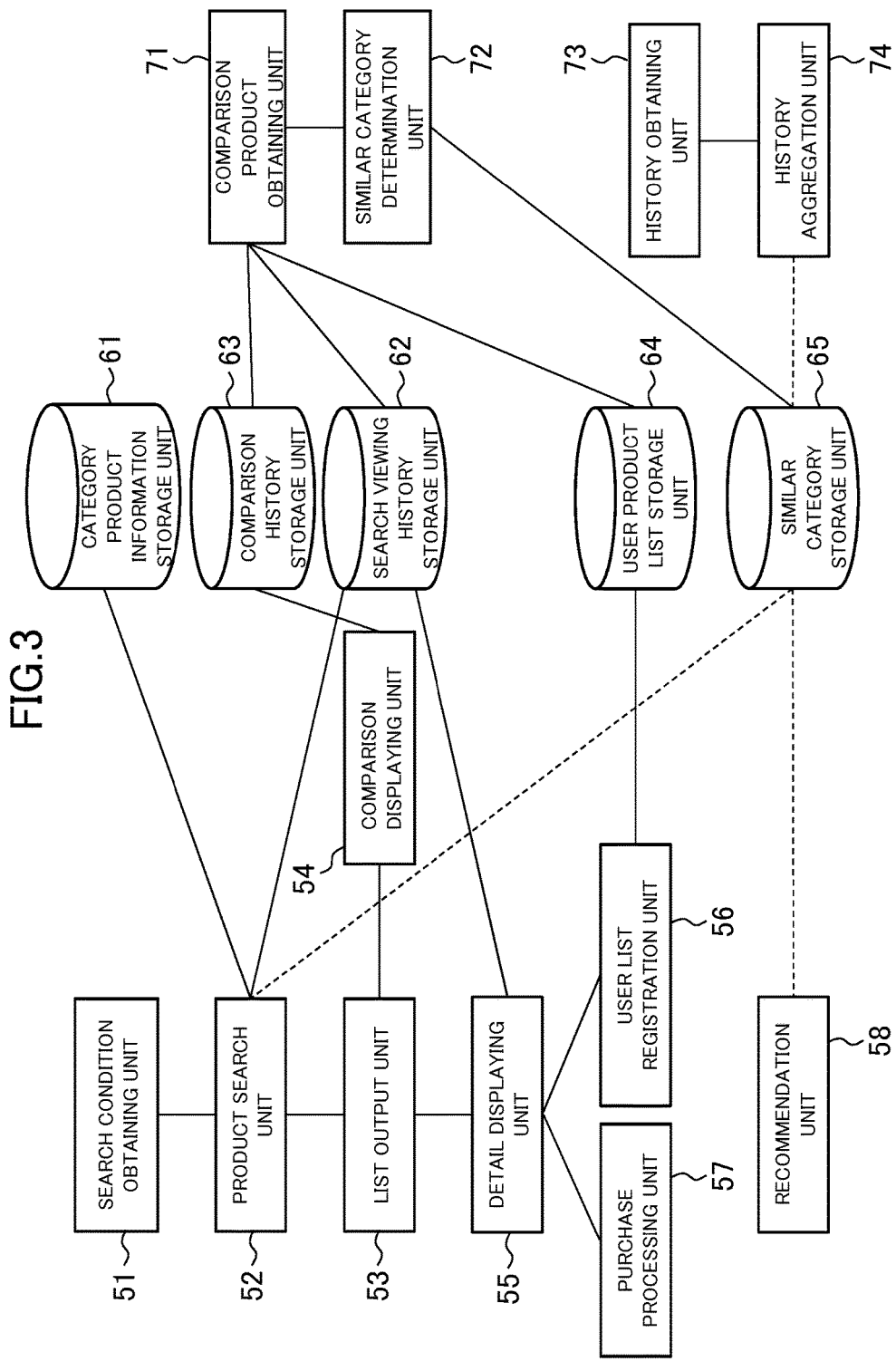
FIG. 3 is a functional block diagram showing functions implemented by the electronic commerce system according to an embodiment of the present invention.

FIG. 3 is a functional block diagram showing functions implemented by the electronic commerce system according to an embodiment of the present invention. The electronic commerce server 1 functionally includes a search condition obtaining unit 51, a product search unit 52, a list output unit 53, a comparison displaying unit 54, a detail displaying unit 55, a user list registration unit 56, a purchase processing unit 57, a recommendation unit 58, a category product information storage unit 61, a search viewing history storage unit 62, a comparison history storage unit 63, and a user product list storage unit 64. Further, the similar category identifying server 2 functionally includes a comparison product obtaining unit 71, a similar category determination unit 72, a similar category storage unit 65, a history obtaining unit 73, and a history aggregation unit 74. These functions are implemented by the processor 11 by executing a program stored in the storage unit 12 and controlling the communication unit or the like. The category product information storage unit 61, the search viewing history storage unit 62, the comparison history storage unit 63, and the user product list storage unit 64 are implemented mainly using the storage unit 12 of the electronic commerce server 1, and the similar category storage unit 65 is implemented mainly using the storage unit 12 of the similar category identifying server, though these may be implemented using a storage device included in another server instead. These may be implemented using not only a storage device but also a database management system included in another service.

A product database and category information are stored in the category product information storage unit 61. The product database includes a plurality of records available for every product. Each record includes a product ID, a product name, the ID of a category to which the product belongs, a price, a product description, the shop ID of a shop that sells the product. The category information includes a category ID, a category name, and a parent category ID. A parent-child relationship of categories is expressed by the parent category ID. The parent-child relationship of categories has a hierarchical structure including a plurality of hierarchical levels. Specifically, like "pharmaceutical drug, quasi-drug/quasi-drug/nutrients, physical exhaustion", the parent category of the "nutrients, physical exhaustion" category is "quasi-drug", and the parent category of "quasi-drug" is "pharmaceutical drug, quasi-drug". This hierarchical structure has a tree structure, and includes virtual category that make a route of the hierarchical structure. One category is a parent of one or more categories.

Initially, while describing the processing by the electronic commerce server 1, data on a history of user operations, which is used in extraction of similar categories, will be described.

Figure 4:
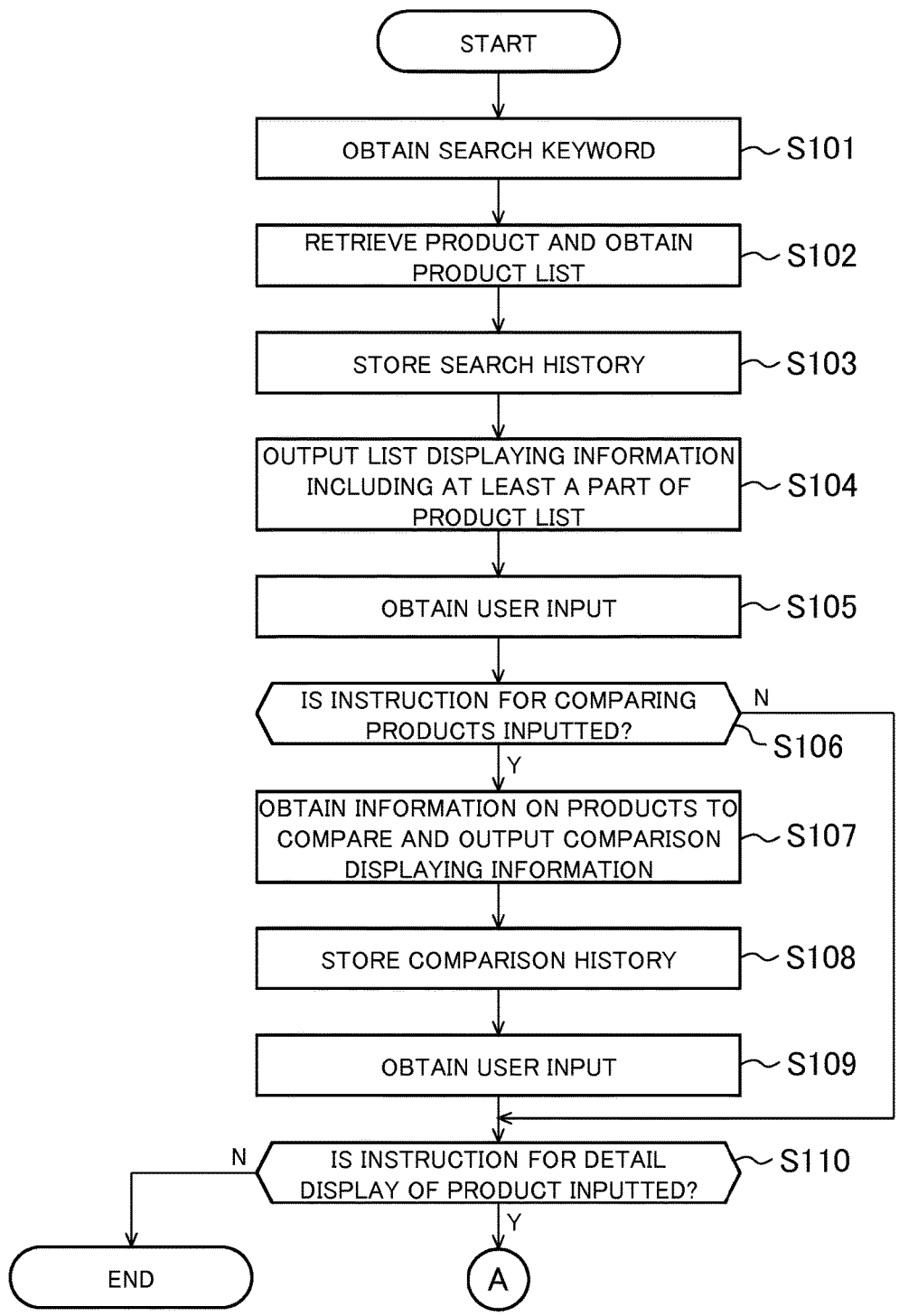
FIG. 4 shows one example of a flow of processing by the electronic commerce server.
Figure 5:
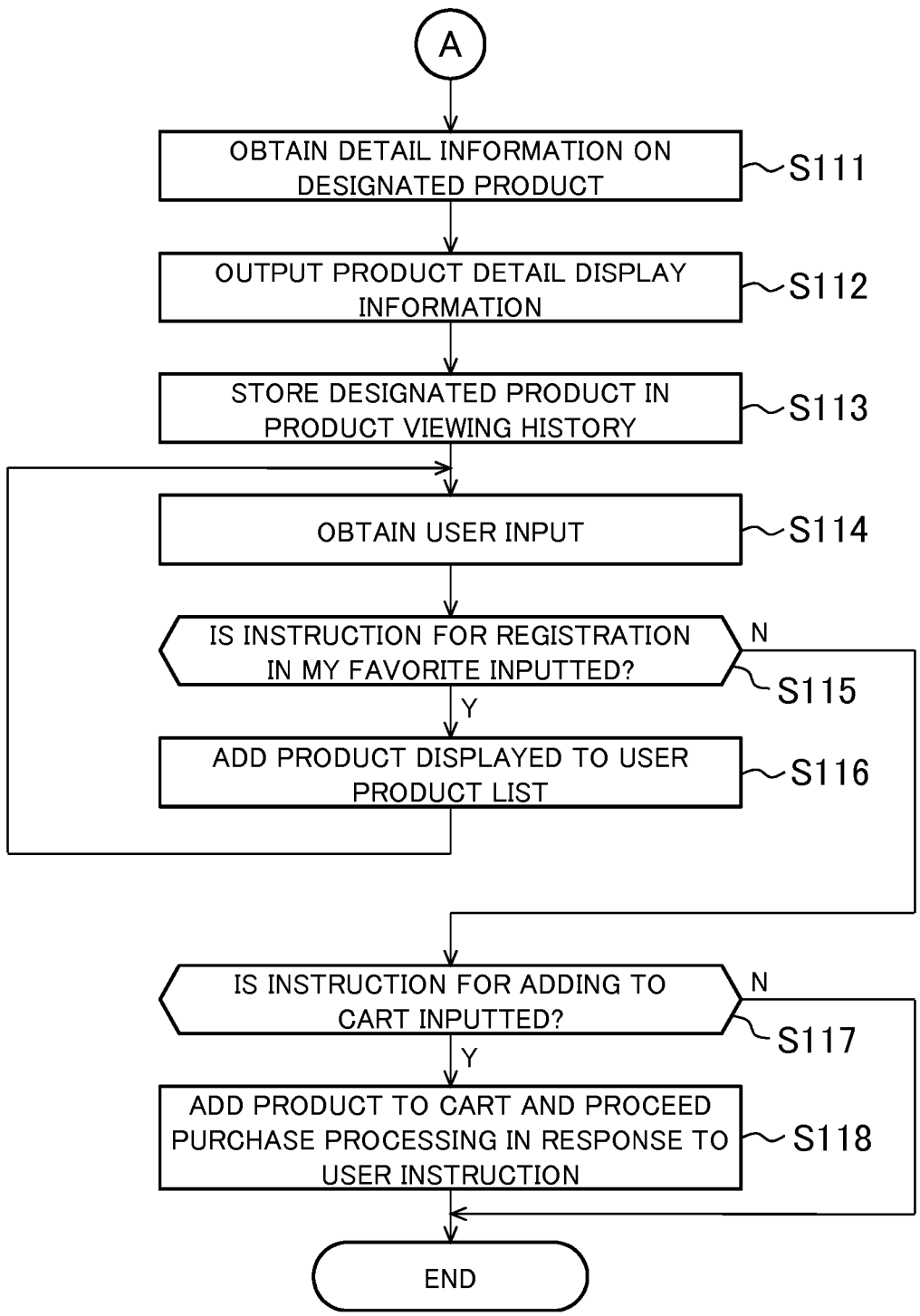
FIG. 5 shows one example of a flow of processing by the electronic commerce server.

FIGS. 4 and 5 show one example of a flow of processing by the electronic commerce server 1. In the following, a function implemented by the electronic commerce server 1 will be described, following the processing flow.

The search condition obtaining unit 51 is implemented mainly using the processor 11, the storage unit 12, and the communication unit 13. The search condition obtaining unit 51 sends to the user client 3 data for displaying a screen for inputting a search condition in the user client 3, and obtains a search keyword as a search condition inputted by a user (step S101). Note that a search condition may not be necessarily a search keyword alone, but may include a condition, such as, a category, a price, or the like.

The product search unit 52 is implemented mainly using the processor 11 and the storage unit 12. The product search unit 52 searches for and retrieve a product from a product database stored in the category product information storage unit 61, using the search keyword obtained as the search condition, and adds the product retrieved to a product list (step S102). Specifically, the product search unit 52 obtains records including a product name and/or a product description that include the search keyword, and also a plurality of products (specifically, a product ID, or the like) indicated by the records as a product list. A product is uniquely identified by a product ID in this embodiment.

Then, the product search unit 52 stores a search history in the search viewing history storage unit 62 (step S103). FIG. 6 shows one example of the search history. The search history includes the user ID of a user having inputted a search condition and instructed to conduct a search, a search keyword used in the search conducted by the product search unit 52 to search for and retrieve a product, and information on the timestamp of the search. The search history may additionally include a list of products retrieved as the search result and access identification information (an IP address, a session ID, or the like) for identifying a user having performed a search operation without logging in.

The list output unit 53 is implemented mainly using the processor 11, the storage unit 12, and the communication unit 13. The list output unit 53 sends the user client 3 list displaying information for displaying a screen showing at least a part of the product list of products retrieved, and displays the screen in the user client 3 (step S104).

FIG. 7 shows one example of the product list screen. On the product list screen, products of which the number is not more than the number of products that can be displayed on one screen among the products included in the product list are displayed. In the space for each product shown on the list display screen includes a "compare" check box and a button. When a user checks the check box of a product to compare, and then clicks the "compare" button, the user client 3 sends a comparison instruction and information on the product to compare to the electronic commerce server 1. Further, when a user clicks the product name, which makes a link, the user client 3 sends to the electronic commerce server 1 information for identifying the product and an instruction to display the product in detail.

Thereafter, the list output unit 53 obtains an input by the user concerning the list display screen (step S105). When the input obtained is to instruct product comparison (Y at step S106), the comparison displaying unit 54 obtains information for identifying the product designated by the user, and also obtains detail information on the product from the category product information storage unit 61. Then, the comparison displaying unit 54 generates comparison displaying information for outputting a product comparison screen including the detail information on the product, and outputs to the user client 3 (step S107).

The comparison displaying unit 54 is implemented mainly using the processor 11, the storage unit 12, and the communication unit 13. FIG. 8 shows one example of the product comparison screen. The whole product comparison screen shows details on a product in a tabular format defined by a row prepared for every attribute of the product, such as a product name, an image, a price, a product description, or the like, and a column prepared for every product. A user can compare the products they wishes to compare for every attribute thereof. When a user clicks the product name, which makes a link, the user client 3 sends an instruction to display the product in detail to the electronic commerce server 1.

The comparison displaying unit 54 stores a comparison history including information on the products compared in the comparison history storage unit 63 (step S108). FIG. 9 shows one example of a comparison history record. A comparison history record includes a user ID, a referrer, a timestamp of a comparison, and the product IDs of the plurality of products compared. A referrer exists in an HTTP request that is a comparison request, and includes a URL of a screen from which the HTTP request is made (the comparison request is made). For example, in the case where an access is made via a direct link shown in a blog, the URL of the blog is stored in the referrer; in the case where an access is made from a bookmark, empty information is stored in the referrer. A comparison history record may include access identification information (an IP address, a session ID, or the like) for identifying a user having performed a search operation without logging in. After the above described processing, the comparison displaying unit 54 obtains an input from the user (step S109).

The detail displaying unit 55 is implemented mainly using the processor 11, the storage unit 12, and the communication unit 13. The detail displaying unit 55 outputs product detail displaying information for displaying details on a product designated by the user. Specifically, in the case where the user does not instruct to compare products (N at step S106) or after step S105, the detail displaying unit 55 initially determines whether or not the last input by the user is to instruct displaying detail of the product (step S110). In the case where the input is not to instruct displaying detail of the product (N at step S110), it is determined that an error has occurred and the ongoing processing is ended. Meanwhile, in the case where the input is to instruct detail display of the product (Y at step S110), the detail displaying unit 55 obtains the product ID designated by the user and sent from the user client 3, and obtains detailed information on the product identified by the product ID (the product designated by the user), such as an attribute of the product and/or the name of the category to which the product belongs or the like, from the category product information storage unit 61 (S111). Then, the detail displaying unit 55 outputs product detail displaying information including the attributes of the product for displaying a product detail screen (step S112).

The detail displaying unit 55 stores the product ID of a product instructed to be displayed in detail and a timestamp of the view as a product viewing history record in the search viewing history storage unit 62 (step S113). FIG. 10 shows one example of the product viewing history record. The product viewing history record includes a user ID, a product ID, a timestamp of a view, and a search condition (a search keyword here) used in a search for the products shown on the product list screen from which this product is selected. The product viewing history record is added to the search viewing history storage unit 62 every time a user instructs displaying the product detail screen.

FIG. 11 shows one example of the product detail screen. The product detail screen includes a field to input a quantity, an "add to cart" button, and a "my favorite" button, in addition to the attributes of the product, such as the product name, an image, a price, a detail description, or the like. When the user inputs a quantity in the field on the product detail screen and clicks the "add to cart" button, the user client 3 sends an instruction for cart processing to the electronic commerce server 1. When the user clicks the "my favorite" button, the user client 3 sends an instruction for registration of the displayed product as my favorite to the electronic commerce server 1. Then, the detail displaying unit 55 obtains an input from the user (step S114).

The user list registration unit 56 is implemented mainly using the processor 11 and the storage unit 12. The user list registration unit 56 adds a product instructed by the user to be registered as my favorite to the user product list. Specifically, when the instruction inputted by the user at step S114 is to register a product as my favorite (Y at step S115), the user list registration unit 56 adds the displayed product and the search conditions in a list displayed before displaying the detail to the user product list (step S116). Returning to step S114, the processing is repeated, beginning with input by the next user.

Then, when the user instructs, from the top page or the like, to display "my favorite screen", a list of products registered as "my favorite" is displayed on the "my favorite screen". Similar to the product list screen, the user can shift from the "my favorite screen" to the product detail screen or to the product comparison screen where to compare some of the products displayed in a list. That is, the user product list is a list of products which the user decides to view later. This list is provided for every user.

The purchase processing unit 57 is made mainly using the processor 11, the storage unit 12, and the communication unit 13. When the input at step S114 is not an instruction by the user to register the product as my favorite (N at step S115) but an instruction to add the product to a cart (Y at step S117), the purchase processing unit 57 adds the product to a cart, and proceeds purchase processing in response to a further instruction by the user. Note that information on the product purchased by the user and information on the user are stored in the storage unit 12 as a purchase history record.

Through the above described processing, histories of operations by a user which are used to extract a similar category are generated. The histories of operations are the comparison history, the search history, the product viewing history, the user product list, and the like. Note that processing by the recommendation unit 58 will be described later.

In the following, processing for the respective functions implemented by the similar category identifying server 2 will be described with reference to a processing flow.

The comparison product obtaining unit 71 is implemented mainly using the processor 11 and the storage unit 12. The comparison product obtaining unit 71 obtains (deduces) a plurality of combinations (comparison targets) each including two products to be compared, based on an operation relevant to browsing of products performed by a user.

Figure 12:
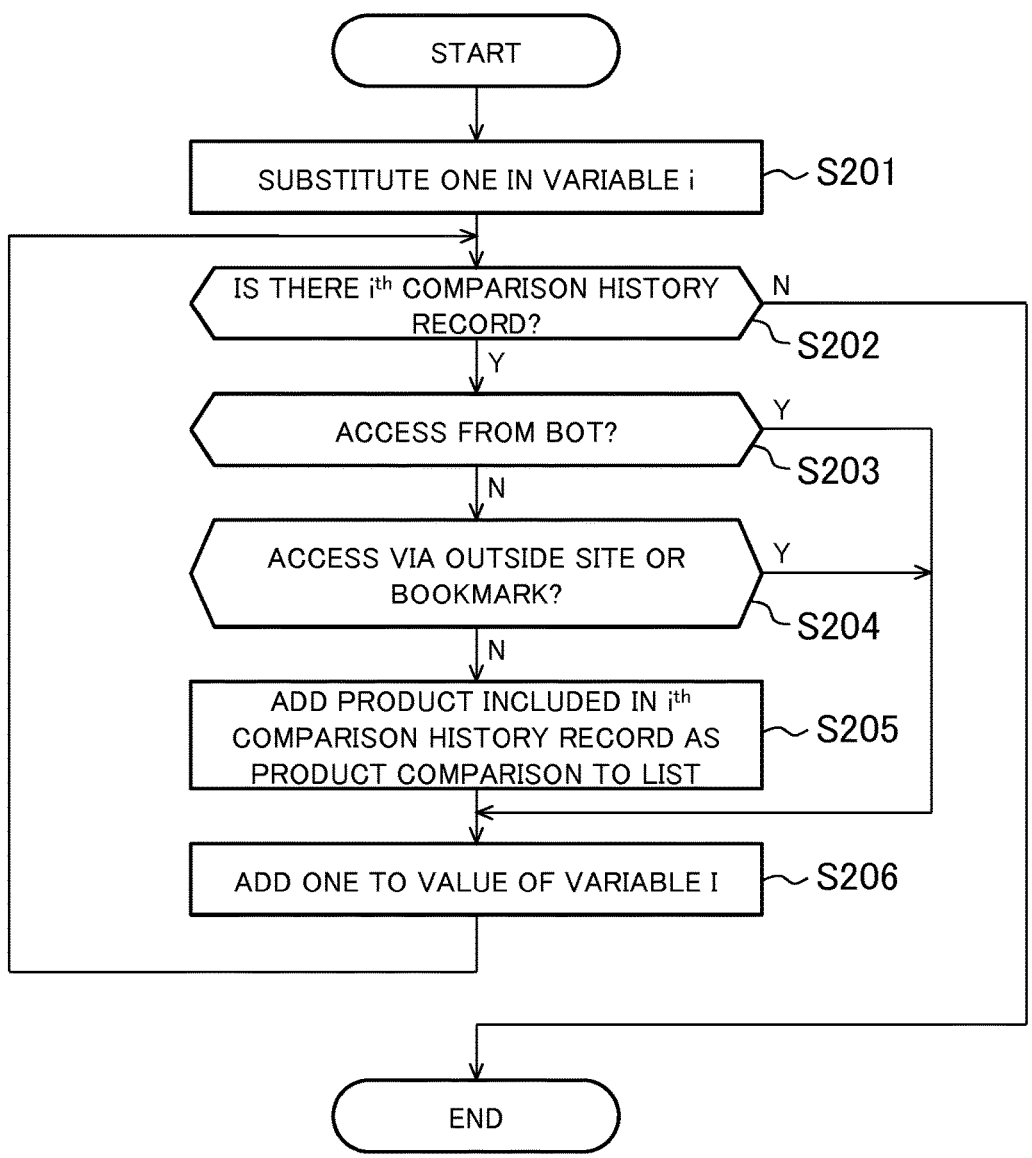
FIG. 12 shows one example of a flow of processing by a comparison product obtaining unit.

FIG. 12 shows one example of a flow of processing by the comparison product obtaining unit 71. This diagram shows processing for obtaining a product combination from the comparison history. Initially, the comparison product obtaining unit 71 substitutes one into the variable i to sequentially access the comparison history records (step S201). Then, the comparison product obtaining unit 71 checks whether or not there is an $i^{th}$ comparison history record (step S201). When there is not an $i^{th}$ comparison history record (N at step S202), processing is ended. Meanwhile, when there is an $i^{th}$ comparison history record (Y at step S202), the comparison product obtaining unit 71 determines whether or not the exceptional condition described below is satisfied.

One of the exceptional conditions is whether or not an operation, such as an instruction or the like to make a comparison that triggers generation of the $i^{th}$ comparison history record, is made through an automatic travelling program (a so-called bot) (step S203). An automatic travelling program is a program for analyzing screen data sent from the electronic commerce server 1 without displaying on the display unit, and sending an instruction to view or the like to the electronic commerce server 1. In the case where the instruction is made from a so-called bot (Y at step S203), the comparison product obtaining unit 71 skips the processing prior to step S206 so as not to add product combinations relevant to the $i^{th}$ comparison history record and thereafter to the list. Note that there are some methods available for determining whether or not it is a bot operation. For example, a user ID and access identification information of a bot may be registered in advance as a black list so as to determine an access from the bot when the user ID and access identification information included in the comparison history record are included in the black list. Alternatively, access logs prior to and subsequent to the access concerned may be obtained, based on the access identification information, to determine an access from a bot when an access is made at a constant interval. Still alternatively, an access from a bot may be determined, simply using user-agent attribute of an HTTP request.

Another one of the exceptional conditions is whether or not an access relevant to the $i^{th}$ comparison history record is made via an outside site or a bookmark (step S204). In the case where an instruction to display a product comparison screen corresponding to the comparison history record is an access via an outside site or a bookmark, in other words, in the case where the product comparison screen is outputted without explicit designation by a user of a product to be displayed as a comparison target via a screen, such as the product list screen or the my favorite screen, that is outputted by the electronic commerce server 1 (Y at step S204), processing prior to step S206 is skipped so as not to add a product combination to the list after the $i^{th}$ comparison history record. Specifically, the comparison product obtaining unit 71 determines whether or not this exceptional condition is satisfied, based on whether the URL stored in the referrer included in the comparison history record indicates an access from a screen generated by the electronic commerce server 1 or an access from a URL of an outside server or a direct access from a bookmark, to thereby determine.

Generally, the product comparison screen is displayed in response to an instruction made via the product list screen or the my favorite screen, as described in connection with the processing by the electronic commerce server 1. According to web technology, however, it is possible to display the product comparison screen by simply clicking a link (URL) in a page of an outside site, in which information on a comparison target is embedded in the link (URL). In the case where the product comparison screen is displayed according to the latter method, it can be understood that the user does not intend to select a comparison target, and therefore the displayed product is not appropriate to make a product combination for use in determination of related categories. This is the reason why the processing at step S104 is executed.

In a case other than the above describe exceptional case (N at step S104), the comparison product obtaining unit 71 adds the combination of products (product IDs) included in the $i^{th}$ comparison history record to the list (step S205). Then, the comparison product obtaining unit 71 adds one to the value of the variable i (step S206) to repeat the processing at step S202 and thereafter.

FIG. 13 shows one example of the product combination list generated by the comparison product obtaining unit 71. This list is stored in the storage unit 12. The content of each record in the list includes a combination (two product IDs) of two products determined to make comparison targets and a user attribute (male, female, age, and so forth) obtained by accessing the user database, based on the user ID. This data is used in processing by the similar category determination unit 72.

Figure 14:
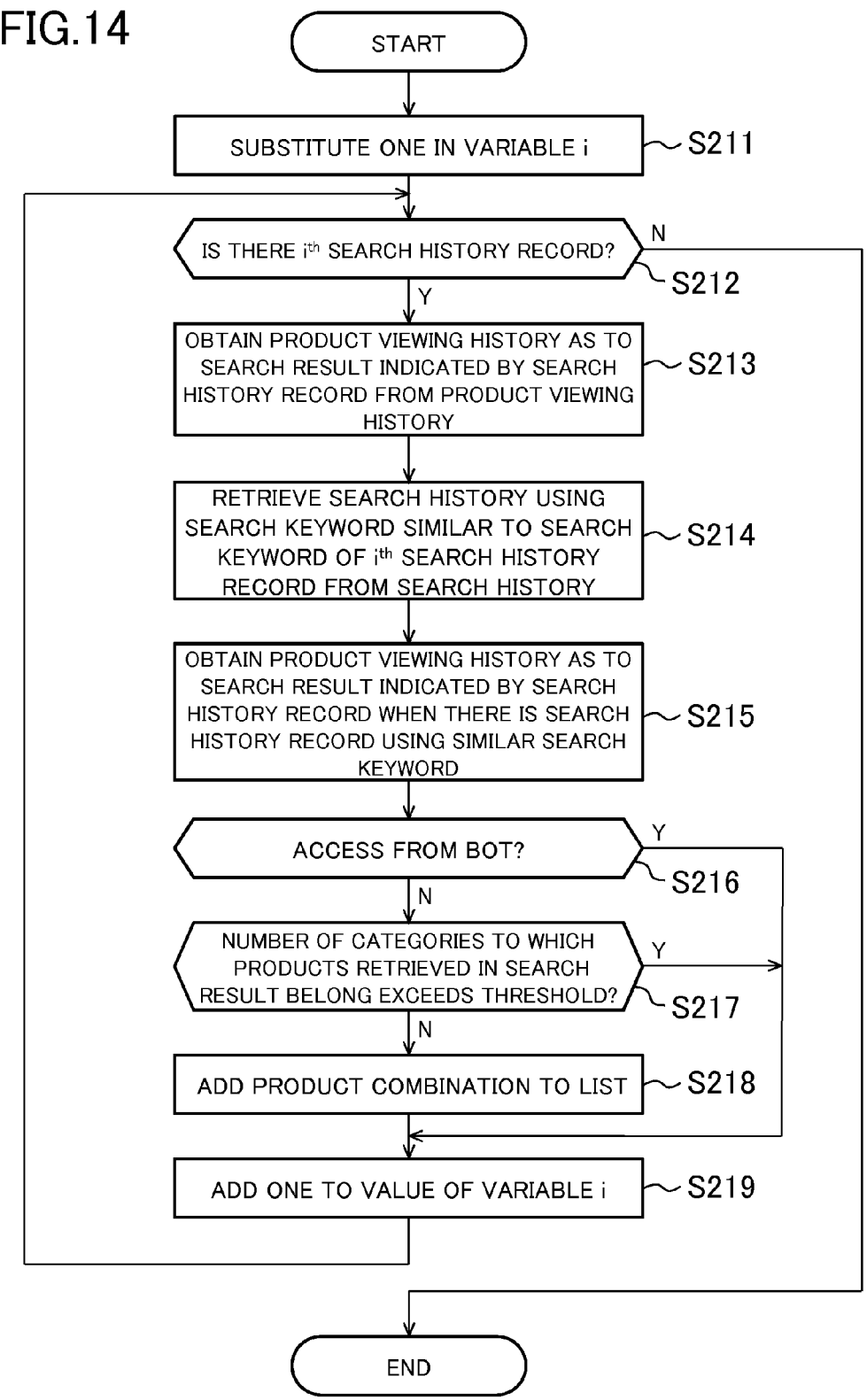
FIG. 14 shows another example of a flow of processing by the comparison product obtaining unit.

FIG. 14 shows another example of a flow of processing by the comparison product obtaining unit 71. This diagram shows processing for obtaining a combination of products compared from the search history and the product viewing history. Initially, the comparison product obtaining unit 71 substitutes one into the variable i for sequentially accessing the search history records (step S211). Then, the comparison product obtaining unit 71 determines whether or not there is an $i^{th}$ search history record (step S212). When there is not an $i^{th}$ search history record (N at step S212), the processing is ended. Meanwhile, when there is an $i^{th}$ search history record (Y at step S212), the comparison product obtaining unit 71 obtains a product viewing history record searched for as described below.

That is, the comparison product obtaining unit 71 obtains a product viewing history record relevant to a product retrieved in a search result indicated by the search history record (step S213). Note that a product viewing history record to be obtained here may be limited to one that satisfies a predetermined condition, such as one including a search time within a predetermined period from the current time, or the like. Then, a search history record that uses a keyword similar to the keyword of the $i^{th}$ search history record is retrieved from the search history stored in the search viewing history storage unit 62 (step S214). In the following, processing at step S214 will be described.

Initially, the comparison product obtaining unit 71 obtains a keyword similar to the keyword of the $i^{th}$ search history record from among the keywords included in the (i+1)th and thereafter search history records. In the above, when the distributional pattern of ratios of the number of the products in the respective categories retrieved in a search using the keyword of the $i^{th}$ search history record is similar to the distributional pattern of ratios of the number of the products in the respective categories retrieved in a search using a different keyword (a keyword included in the search history), the comparison product obtaining unit 71 obtains the different keyword as a keyword similar to the keyword of the $i^{th}$ search history record. Specifically, the comparison product obtaining unit 71 aggregates the number of products in each category retrieved in a search using a keyword, and then divides the aggregate number by the total number of products retrieved in the search using the keyword, to thereby obtain a distributional pattern of ratios of the number of the products in the respective categories with respect to certain keyword.

Further, for every category, the comparison product obtaining unit 71 obtains a difference between the ratios of products in a category as to a keyword and the ratios of products in the same category as to another keyword, and further obtains the residual sum of squares as an index for similarity. When the index is equal to or less than a threshold, the comparison product obtaining unit 71 determines that these keywords are similar to each other. Note that the comparison product obtaining unit 71 may generate a feature vector for each keyword to determine, when the distance between the feature vectors of two keywords among the keywords is equal to or less than a threshold, that these keywords are similar to each other. In the above, an element of the feature vector is prepared for every category, and the value of the element is equal to the ratio of the number of products in a category corresponding to the element. The feature vector may be obtained by normalizing a vector including an element at a value equal to the number of products in the category. The comparison product obtaining unit 71 determines whether or not a keyword included in each of the (i+1)th and subsequent search history records (other search history records) is the similar keyword, to thereby obtain a search history record using the similar keyword.

When there is a search history record that uses the similar keyword, a product viewing history of a product retrieved in a search result indicated by the search history record is obtained (step S215). In the manner described above, the product view histories of products that have been viewed based on two search keywords inputted to search for a product of the same kind, though not exactly the same, can be obtained. These products highly likely make comparison targets, and therefore are considered appropriate to be targets of processing to be described later. Note that it may be arranged to obtain only a plurality of products having been repetitively viewed from the product view history of products retrieved in a search result using a search keyword. With the above, a product more highly likely to be a comparison target can be extracted.

Figure 21:
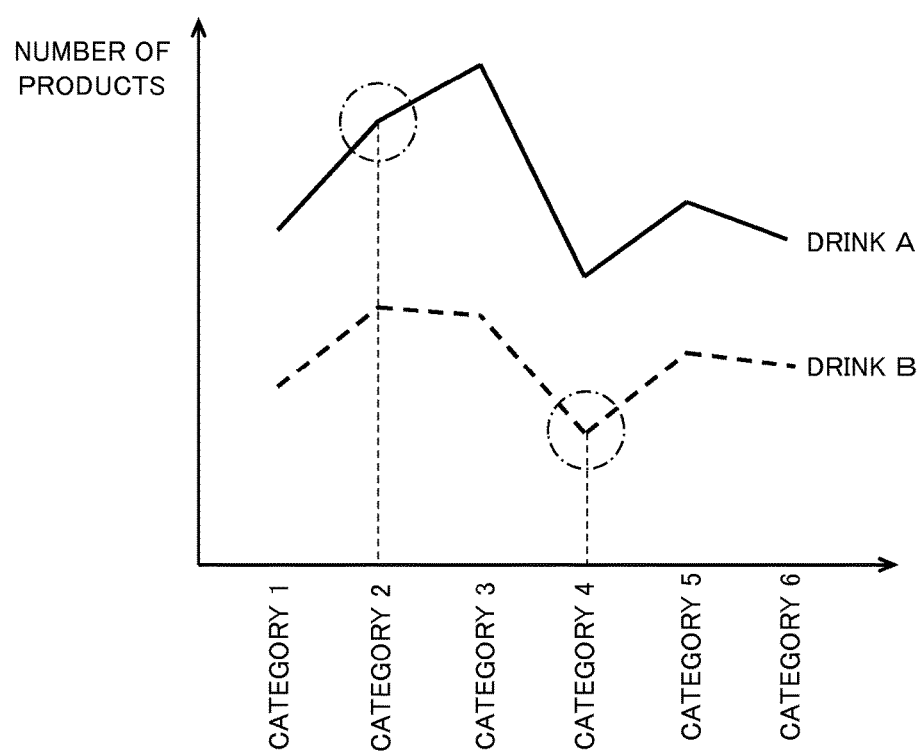
FIG. 21 shows one example of distributions, in ratio, of the products as to a certain keyword and a different keyword, respectively.

FIG. 21 shows one example of distributional patterns of the number of products as to a keyword and another keyword, respectively. FIG. 21 shows a distributional pattern of the number of products in the respective categories retrieved in a search by the product search unit 52 when "drink A" is inputted as a search keyword and a distributional pattern when "drink B" is inputted. When these two search keywords are similar to each other, and the detail displaying unit 55 displays in detail a product belonging to the category 2 among the products retrieved as the search result based on "drink A" and a product belonging to the category 5 among the products retrieved as the search result based on "drink B", it can be determined through the processing to be described later that the category 2 is similar to the category 5. This enables determination of a similar category, based on fewer data.

Thereafter, the comparison product obtaining unit 71 determines whether or not exceptional conditions mentioned below are satisfied. One of the exceptional conditions is whether or not an operation for viewing a product is made through an operation by an automatic travelling program (a so-called bot) (step S216). In the case where a product is viewed in response to an instruction from a so-called bot (Y at step S216), the comparison product obtaining unit 71 skips the processing up to step S218 inclusive.

Another one of the exceptional conditions is whether or not the number of categories to which the products retrieved as the search result (the products outputted by the list output unit 53) belong exceeds a threshold for the number of categories (step S217). For example, in the case where a product is searched for, using the name of a TV program that has introduced the product as a search keyword, the resultant categories may tend to be spread widely. As the categories of products to be viewed in this situation may have only weak relevance to each other, compared to in an otherwise case, such search result is desirably excluded from data for use in determination of category relevance. Specifically, the comparison product obtaining unit 71 aggregates the number of kinds of categories to which a plurality of products retrieved by searching the product database, using a search keyword indicated by the search history record, belong, and then skips the processing at S218 when the number of the kinds exceeds a threshold for the number of categories (Y at step S217).

When the above mentioned two exceptional conditions are not satisfied (N at step S217), the comparison product obtaining unit 71 adds to the list the combination of products (product ID) obtained at step S213 or S215 and an attribute (male, female, age, and so forth) of the user obtained by accessing the user database, based on the user ID (step S218). Then, the comparison product obtaining unit 71 adds one to the value of the variable i (step S219) to repeat the processing at step S212 and thereafter.

Note that the comparison product obtaining unit 71 may obtain a list of combinations of products to be compared, using information on a product included in the user product list and/or a search keyword, instead of the product viewing history, shown as an example in FIG. 13.

The similar category determination unit 72 is implemented mainly using the processor 11 and the storage unit 12. The similar category determination unit 72 determines two mutually similar categories among a plurality of categories, based on the number of times at which a product classified in one category and a product classified in the other category are deduced as comparison targets. This number of times is equal to the number of times aggregated as to a combination of two of a plurality of categories, in other words, the number of times at which an object classified in one category belonging to a certain combination and an object classified in the other category belonging to the same combination are deduced as comparison targets.

Figure 15:
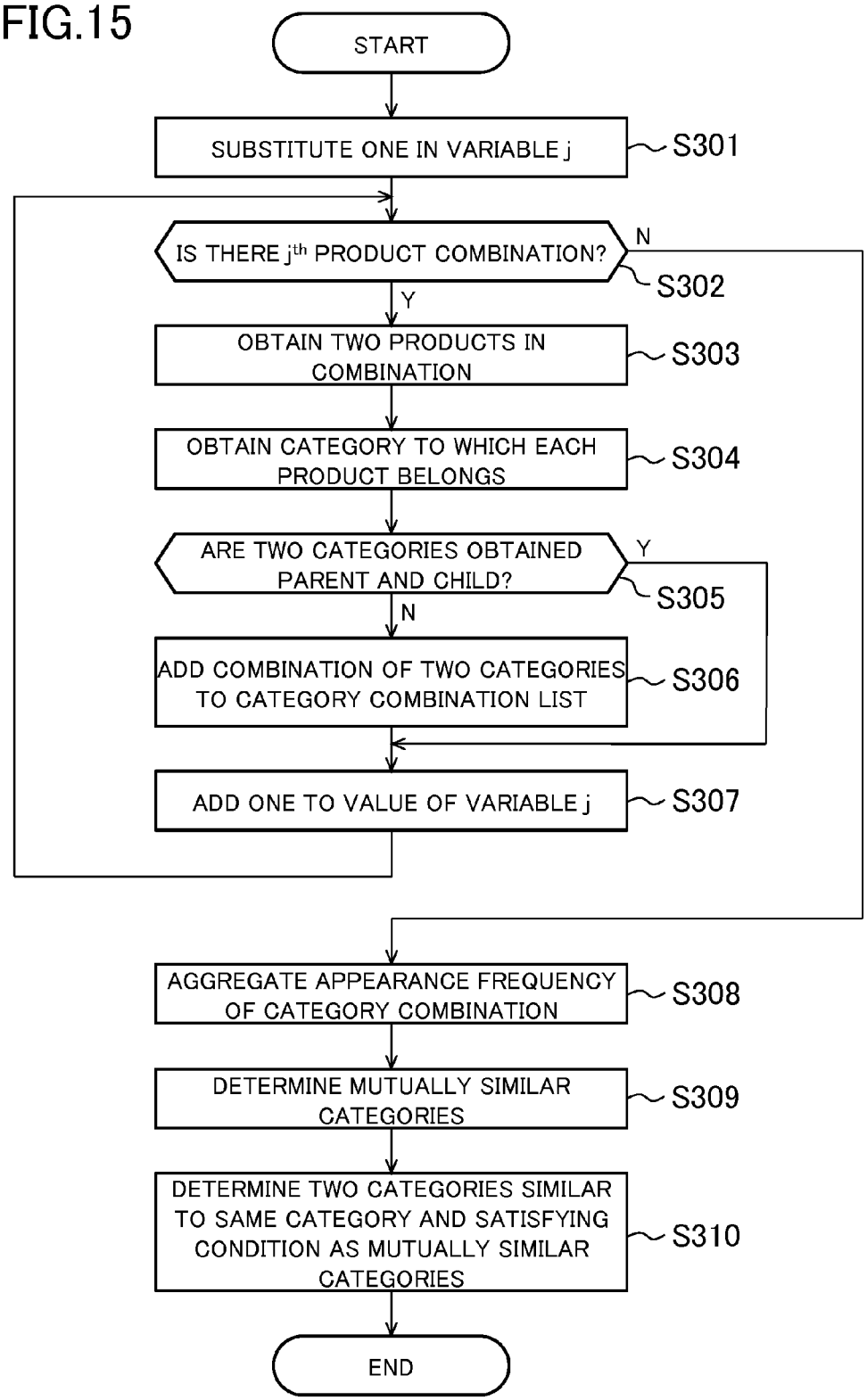
FIG. 15 shows one example of a flow of processing by a similar category determination unit.

FIG. 15 shows one example of a flow of processing by the similar category determination unit 72. Initially, the similar category determination unit 72 substitutes one into a variable j that indicates the ranking of a product combination to be obtained from the list (step S301). Then, whether or not there is a $j^{th}$ product combination in the list is checked (step S302). When there is not a $j^{th}$ product combination in the list (N at step S302), the similar category determination unit 72 executes processing at step S308 and thereafter without executing processing to be described later.

Meanwhile, when there is a $j^{th}$ product combination in the list (Y at step S302), the similar category determination unit 72 obtains the $j^{th}$ product combination from the list (step S303), and obtains categories to which the two respective products belonging to the combination belong (step S304). Note that the category is obtained by the similar category determination unit 72 by searching the product database, based on the product IDs of these two products. When the two categories do not have a parent-child relationship (N at step S305), the similar category determination unit 72 registers the combination of these two categories in the category combination list so as to be correlated to an attribute of the user (step S306). Meanwhile, when the two categories have a parent-child relationship (Y at step S305), the processing at step S306 is skipped. It is obvious that categories having a parent-child relationship do not have a similarity relationship, the above described processing can remove noise. Then, the similar category determination unit 72 adds one to the value of the variable j (step S307) to repeat the processing at step S302 and thereafter.

Note that when any of the two categories is a specific category, the similar category determination unit 72 may not register in the category combination list. For example, in the case where a category to include various products is provided in advance as the specific category, it is possible to prevent determination of erroneous similarity between categories.

After execution of the processing at step S303 to S306 with respect to all of the product combinations included in the list (N at step S302), the similar category determination unit 72 aggregates the frequency of appearance of each category combination included in the category combination list (step S308).

FIG. 16 shows one example of aggregate data indicating an aggregate frequency of appearance of a category combination. The aggregate data includes a record that includes one (category 1) of the categories that make a category combination, the other one (category 2) of the categories, and the number of time at which the combination of the categories 1 and 2 is included in the category combination list, in other words, the number of times at which a product in the category 1 is compared with a product in the category 2, and the record is available for every combination of the category 1 and the category 2. In FIG. 16, the respective categories in the category hierarchical structure are identified by their names divided by slash (/), though it is acceptable in view of processing that a category ID is simply stored. In addition, the number of records including the category 1 in the category combination list, that is, the number of times at which a product included in the category 1 is compared, and similarly, the number of times at which a product included in the category 2 is compared as well, are stored in a record of the aggregate data. Alternatively, the aggregate frequency of appearance may be obtained for every user attribute. In the above, the number of times of comparison as to the combination of the categories 1 and 2 corresponds to the total number of times at which a product classified in the category 1 is compared with a product classified in the category 2.

Though not shown in FIG. 16, using the number of times of comparison involving a product included in the category 1, the number of times of comparison involving a product included in the category 2, and the number of times of comparison between a product in the category 1 and a product in the category 2, the similar category determination unit 72 generates a score that indicates relevance between the two categories, and stores the score in a record of the aggregate data. For example, the score may be generated by normalizing the number of times of comparison between a product in the category 1 and a product in the category 2.

Thereafter, the similar category determination unit 72 determines a combination of mutually similar categories, based on the aggregate data (step S309). Specifically, the similar category determination unit 72 determines a category combination which have been compared with each other at a number of times greater than a predetermined value among the category combinations in the aggregate data and having the above mentioned score equal to or greater than a threshold as mutually similar categories. Information for correlating the mutually similar categories determined is stored in the similar category storage unit 65. Note that the similar category determination unit 72 may determine a similar category combination for every user attribute, and store the category combination in the similar category storage unit 65 so as to be correlated to the user attribute.

Further, the similar category determination unit 72 determines two categories that are similar to the same category and satisfy the condition mentioned below as mutually similar categories, and stores in the storage unit 12 so as to be correlated to each other (step S310). This is equivalent to considering, as to one category similar to another category similar to still another category, all these categories as a similar category group when the condition mentioned below is satisfied.

There are some kinds of conditions, and requirement is that one of these is satisfied. In the following, the conditions are described, based on an assumption that a category A is similar to a category B, and a category C is similar to the category B.

Figure 17:
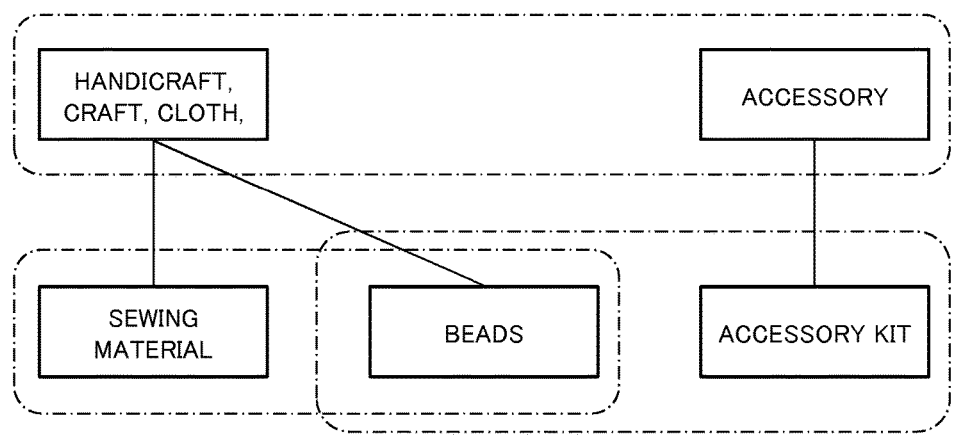
FIG. 17 shows one example of parent-child and similarity relationship between categories.

A first condition is that the parent category of the category A is the same as or similar to the parent category of the category B. FIG. 17 shows one example of a parent-child and similarity relationship between categories. The categories enclosed by the alternate long and short dash line in FIG. 17 are similar to each other. Specifically, in the case where the "sewing material" and "beads" categories are similar, the "beads" and "accessory kit" categories are similar, and the "handicraft, craft, cloth" category, which is the parent category of the "sewing material" category, is similar to the "accessory" category, which is the parent category of the "accessory kit" category, the similar category determination unit 72 determines that the "sewing material" category and the "accessory kit" category are mutually similar categories, and stores information for correlating these categories in the similar category storage unit 65.

A second condition is that a score on similarity between the character string of the category name of the category A and that of the category C is calculated, and the score indicates some extent of similarity. A third condition is that search keywords used in searches for products included in the category A and search keywords used in searches for products included in the category B are obtained from the viewing history or search history, and some of these search keys are duplicate to some extent or greater. When any of these conditions is satisfied, it may be considered that the categories A and C are relevant to each other to some extent, and thus similar to each other.

Alternatively, when there is a comparison history record relevant to a case in which the comparison displaying unit 54 displays products classified into respective categories A, B, and C as comparison targets on one screen, the similar category determination unit 72 may consider that the categories A and C are similar to each other.

The information stored in the similar category storage unit 65 is used in a product search that is conducted using a category via the electronic commerce server 1 and/or in aggregation for every category of purchase history records on purchases that are made via the electronic commerce server 1. In the following, some examples of use will be described.

The similar category information is used also for recommendation of a product to a user. The recommendation unit 58 is implemented mainly using the processor 11, the storage unit 12, and the communication unit 13. The recommendation unit 58 searches the purchase history generated upon purchase operation by users, retrieves other products that are purchased by another user having purchased the product viewed by the user, and displays a list of the other products to thereby encourage the user viewing the list to consider buying the other products. Note that the purchase history record includes information, such as a user ID, a product purchased by a user, a price, and the like.

Figure 18:
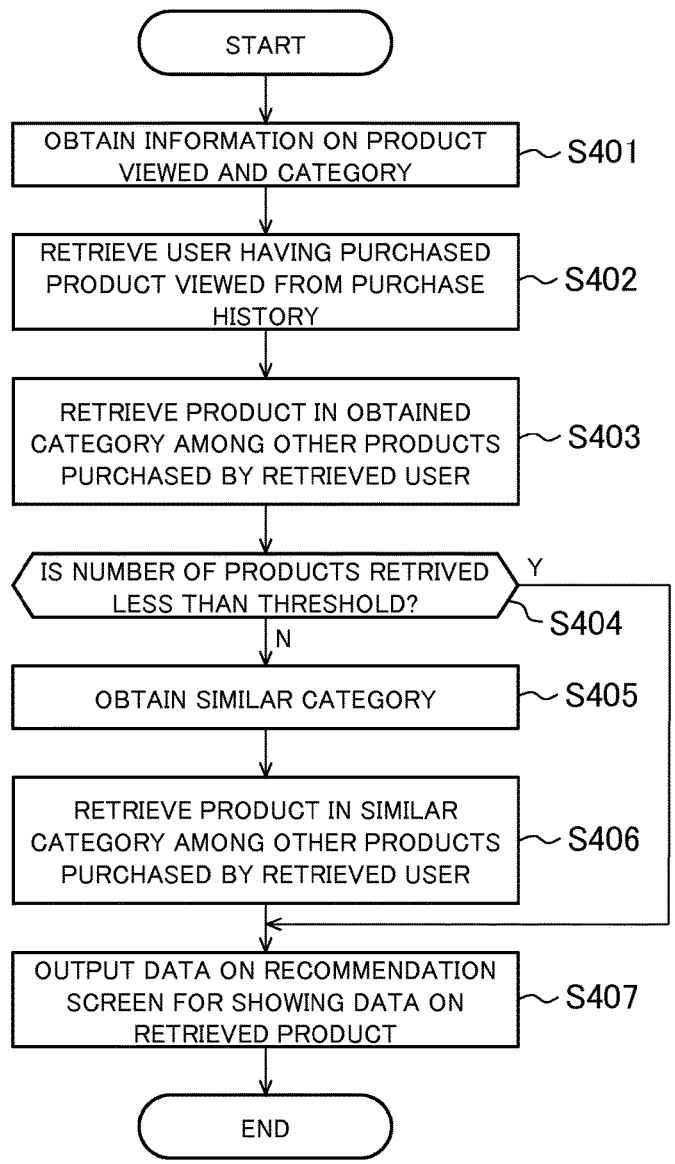
FIG. 18 shows one example of a flow of processing by a recommendation unit.

FIG. 18 shows one example of a flow of processing by the recommendation unit 58. Initially, the recommendation unit 58 obtains a product which a user has viewed within a predetermined period of time and information on the category of the product (step S401). Then, the recommendation unit 58 retrieves a user who has purchased the obtained product from the purchase history (step S402). Further, the recommendation unit 58 retrieves, from the purchase history, a product belonging to the category obtained among other products purchased by the retrieved user (step S403). When the number of products retrieved is less than a threshold for output (for example, five) (Y at step S404), the recommendation unit 58 obtains a category similar to that category from the similar category storage unit 65 (step S405), and retrieves, from the purchase history, a product belonging to the similar category among the other products purchased by the retrieved user (step S406). In the case where the number of products retrieved at step S403 is equal to or greater than the threshold for output (for example, five), steps S405 and S406 are skipped. Then, the recommendation unit 58 outputs data on the recommendation screen showing the products retrieved at step S403 and step S406 to the user client 3 (step S407). Note that at step S405, a similar category may be obtained, using a mutually similar category combination correlated to an attribute of the user viewing the products. This makes it possible to cope with a case in which similarity of categories may be determined different between a male and a female, for example. Note that at step S401, category information may not be necessarily obtained. In such a case, at step S405, the recommendation unit may obtain a category to which a product retrieved for recommendation belongs, and may obtain information on a category similar to that category.

FIG. 19 shows one example of the recommendation screen. For example, supposing that the category of instant udon noodle and that of fresh udon noodle are similar categories, it is possible to recommend a larger number of products when the number of products for recommendation retrieved from one category is small. Note that the recommendation unit 58 has two functions, namely, a function of searching for and retrieving a product from the purchase history and a function of displaying the product retrieved in a list.

Note that a similar category can be used not only for recommendation but also in processing by the product search unit 52 or the list output unit 53, in particular, in processing for searching the product database, using a search condition, such as a keyword or the like, to display a list. In this case, in the flow of processing shown in FIG. 18, the product database is searched, instead of the purchase history, using a search condition other than a category, instead of a viewed product. Further, when the list output unit 53 or the like conducts a search within a category, the list output unit 53 or the like may output display data for showing a link or the like on a screen for allowing a user to designate to execute processing with respect to a similar category, instead of executing processing with respect to a similar category at once. For example, screen data for displaying on a screen showing a product list or product purchase ranking in a category, for example, a link to a screen showing a product list or purchase ranking in a similar category may be outputted.

When a user selects a product for comparison on the product list screen, the list output unit 53 may output data on the screen on which the selection is made such that the display manner of a product belonging to the category of the product selected and that of a product belonging to a similar category are changed (for example, the color of the background of the part showing the details of the product may be changed or lit). This facilitates selection of a product for comparison by a user. FIG. 20 shows another example of the product list screen, showing an example in which a space for a product belonging to a category similar to the category of the product selected is lit.

When a similar category can be readily obtained, as described above, and it thus becomes possible to take a similar category into consideration in a search or for recommendation, it is possible to avoid a situation in which only one of the similar categories is subjected to search or recommendation. As it is possible to avoid a situation in which a product that is registered in the other category alone cannot be found, a shop can reduce a loss of chance for sale.

In addition, a similar category is used in aggregation of history records relevant to a product, such as purchase history records or viewing history records, to analyze a sales situation. The history obtaining unit 73 and the history aggregation unit 74 are implemented mainly using the processor 11 and the storage unit 12. The history obtaining unit 73 obtains a history relevant to a product, such as the viewing history or the purchase history. The history aggregation unit 74 aggregates the history records obtained, using a category. As to mutually similar categories stored in the similar category storage unit 65, in particular, the history aggregation unit 74 aggregates the history records, using a group including these categories. For example, the aggregation unit 74 outputs a value that is an addition of the sales of products in the "pharmaceutical drug, quasi-drug/quasi-drug/nutrients, physical exhaustion" category and that in the "health food/nutrition, healthy drink/nutritional drink" category. This makes it possible to reduce influence on statistics, of products classified into a plurality of categories widely spread, and also to analyze a purchase history or the like more accurately.

Although a case has been described in the above in which products are classified into categories, other objects, such as cooking information, accommodation facility, and so forth, may be classified into categories as these objects as well have a feature to be displayed in a list and/or in detail in response to an instruction by a user and to be compared.

Although a case has been mainly described in the above in which two objects are compared with each other through any operation, and similar category is determined through detection of the comparison, a case in which comparison between three or more objects is utilized in determination of a similar category is included in the application range of the present invention because comparison of three or more objects includes comparison of two objects out of the three objects.

The invention claimed is:

1. An information processing system, comprising:
  at least one processor; and
  at least one memory device that stores a plurality of instructions, which when executed by the at least one processor, causes the at least one processor to:
  obtain a distributional pattern ratio of each of a plurality of keywords in search history records, wherein the distributional pattern ratio of a target keyword among the plurality of keywords is obtained by dividing a number of objects in each of a plurality of categories retrieved in the search of the target keyword, by a total number of objects retrieved in a search of the target keyword;
  obtain a first keyword and a second keyword among the plurality of keywords wherein the second keyword is similar to the first keyword,
  wherein the first and second keywords are obtained when a distributional pattern ratio of the first keyword is similar to a distributional pattern of ratio of the second keyword;
  deduce, as comparison targets, a first object and a second object among a plurality of objects with respect to which the user's instruction is displaying in detail among a plurality of objects that are retrieved based on the first and second keywords wherein the first object is retrieved based on the first keywords and the second object is retrieved based on the second keywords;
  determine two categories into which the two objects are respectively classified as similar categories, based on a number of times at which the first object retrieved by the first keyword and the second object retrieved by the second keyword are deduced as the comparison targets;
  obtain a purchase or viewing history record relevant to an object for aggregation; and
  aggregate the purchase or viewing history records relevant to the object for aggregation, using a category into which the object is classified,
  wherein, in the aggregation, the purchase or viewing history records are aggregated using a group including the two categories similar to each other.

2. The information processing system according to claim 1, wherein at the least one processor deduces two of a plurality of objects which the user instructs to display on one screen for comparison, as the comparison targets.

3. The information processing system according to claim 2, wherein the at least one processor does not deduce a comparison target from among a plurality of objects which the user instructs to display on one screen for comparison not via a screen showing a plurality of objects that are searched for by an object search unit, based on a keyword inputted by the user.

4. The information processing system according to claim 1, wherein the at least one processor deduces two objects among a plurality of objects with respect to which the user instructs an object detail display unit to display in detail among a plurality of objects that are searched for by an object search unit, based on a keyword input by the user.

5. The information processing system according to claim 1, wherein the at least one processor obtains, as the comparison targets, two objects among a plurality of objects which the user registers in a list of objects to view later among a plurality of objects to be displayed in a list.

6. The information processing system according to claim 1, wherein
  the plurality of categories have a hierarchy tree structure; and
  when two categories into which two objects included in a combination of the objects are respectively classified have a parent-child relationship, the at least one processor does not determine the two categories as mutually similar categories.

7. The information processing system according to claim 1, wherein
  the at least one processor deduces the comparison target which is correlated to an attribute of the user, and
  the at least one processor determines two mutually similar categories for every attribute, based on categories into which the two deduced objects are classified and attributes correlated to the respective categories.

8. The information processing system according to claim 1, wherein
  the plurality of categories have a hierarchy tree structure, and when parent categories of two categories that are determined similar to a same category are similar to each other, the at least one processor determines the two categories as mutually similar categories.

9. The information processing system according to claim 1, wherein based on category names of two respective categories which are determined similar to a same category, the at least one processor determines whether or not the two categories are mutually similar categories.

10. The information processing system according to claim 1, wherein based on a search keyword used in searches for objects included in two respective categories that are determined similar to a same category, the at least one processor determines whether or not the two categories are mutually similar categories.

11. The information processing system according to claim 1, further comprising:
a list output unit for outputting data on a screen showing the objects in a list for a user to select an object to be the comparison target; and
a comparison display unit for outputting data on a screen showing details of the object selected on the screen by the user to be the comparison target,
wherein
when the user selects an object to be the comparison target, the list output unit outputs data on the screen on which the object to be the comparison target is selected, such that a display manner of an object classified into a category similar to a category into which the object selected is classified is changed.

12. The information processing system according to claim 1, further comprising:
a unit for retrieving an object, using a search condition including a category designated by the user; and
a unit for displaying a list of objects searched for by a unit for searching the object,
wherein
when a number of objects retrieved based on a search condition designated by the user is less than a predetermined threshold, the unit for retrieving an object retrieves an object, using a search condition including a category similar to the category designated by the user.

13. An information processing system according to claim 1, further comprising:
a recommendation unit for obtaining an object to recommend to the user, and for recommending to the user, when a number of objects obtained is less than a predetermined threshold, any of objects classified into a category similar to a category of the object obtained, in addition to the object obtained.

14. A similar category identification method, comprising:
obtaining, with at least one processor operating with a memory device in a server, a distributional pattern ratio of each of a plurality of keywords in search history records, wherein the distributional pattern ratio of a target keyword among the plurality of keywords is obtained by dividing a number of objects in each of the plurality of categories retrieved in the search of the target keyword by a total number of objects retrieved in a search for the target keyword;
obtaining, with at least one processor operating with a memory device in a server, a first keyword and a second keyword among the plurality of keywords wherein the second keyword is similar to the first keyword,
wherein the first keyword and the second keyword are obtained when a distributional pattern of ratio of the first keyword is similar to a distributional pattern ratio of the second keyword,
deducing, as comparison targets, a first object and second object among a plurality of objects with respect to which the user's instruction is displaying in detail among a plurality of objects that are retrieved based on the first and second keywords with at least one processor operating with a memory device in a server wherein the first object is retrieved based on the first keywords and the second object is retrieved based on the second keywords;
determining, with at least one processor operating with a memory device in a server, two categories into which the two objects are respectively classified as similar categories, based on a number of times at which the first object retrieved by the first keyword and the second object retrieved by the second keyword are deduced as the comparison targets;
obtaining, with at least one processor operating with a memory device in a server, a purchase or viewing history record relevant to an object for aggregation; and
aggregating, with at least one processor operating with a memory device in a server, the purchase or viewing history records relevant to the object for aggregation, using a category into which the object is classified,
wherein, in the aggregation, the purchase or viewing history records are aggregated using a group including the two categories similar to each other.

* * * * *